United States Patent Office 3,421,966
Patented Jan. 14, 1969

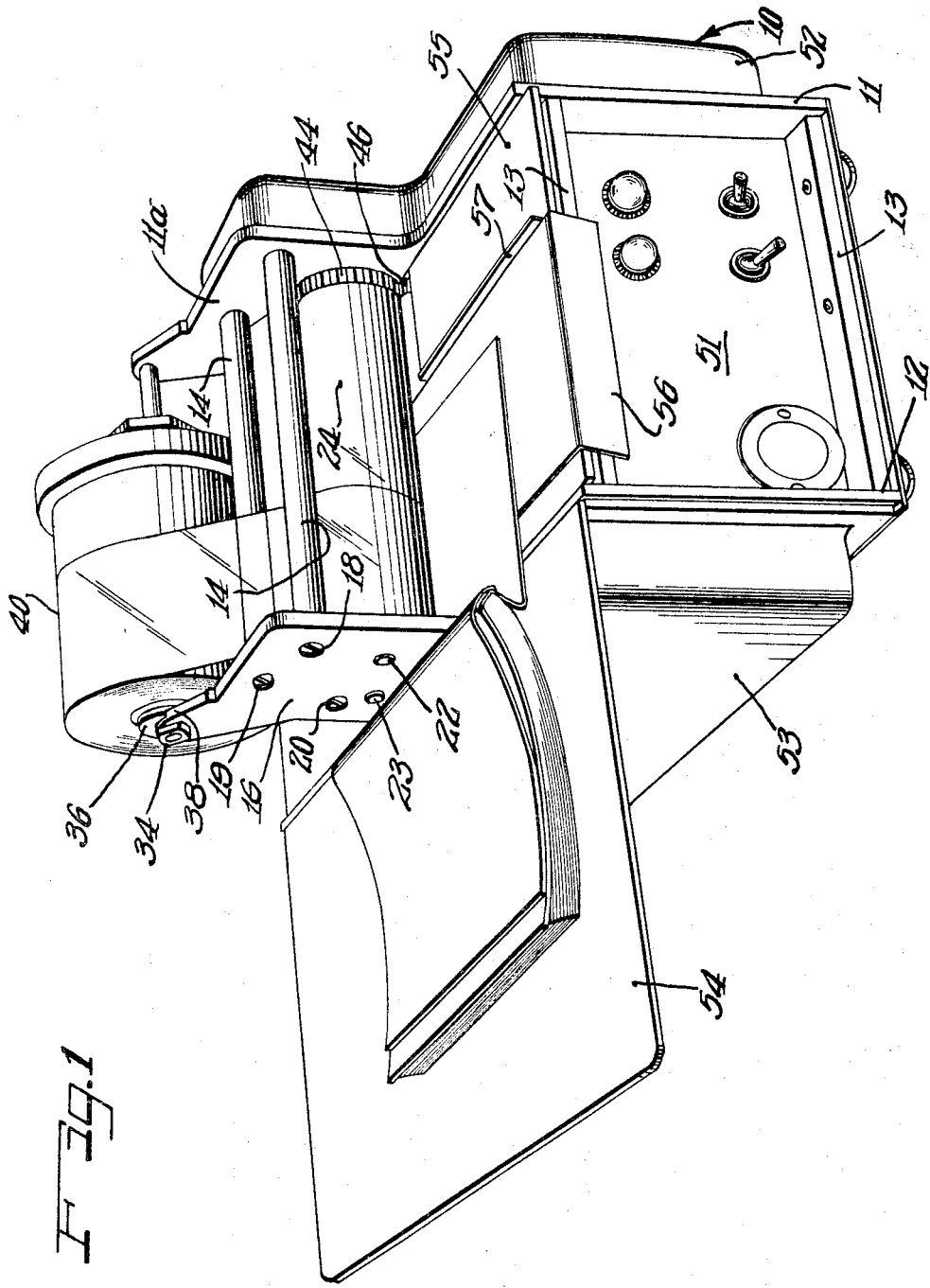

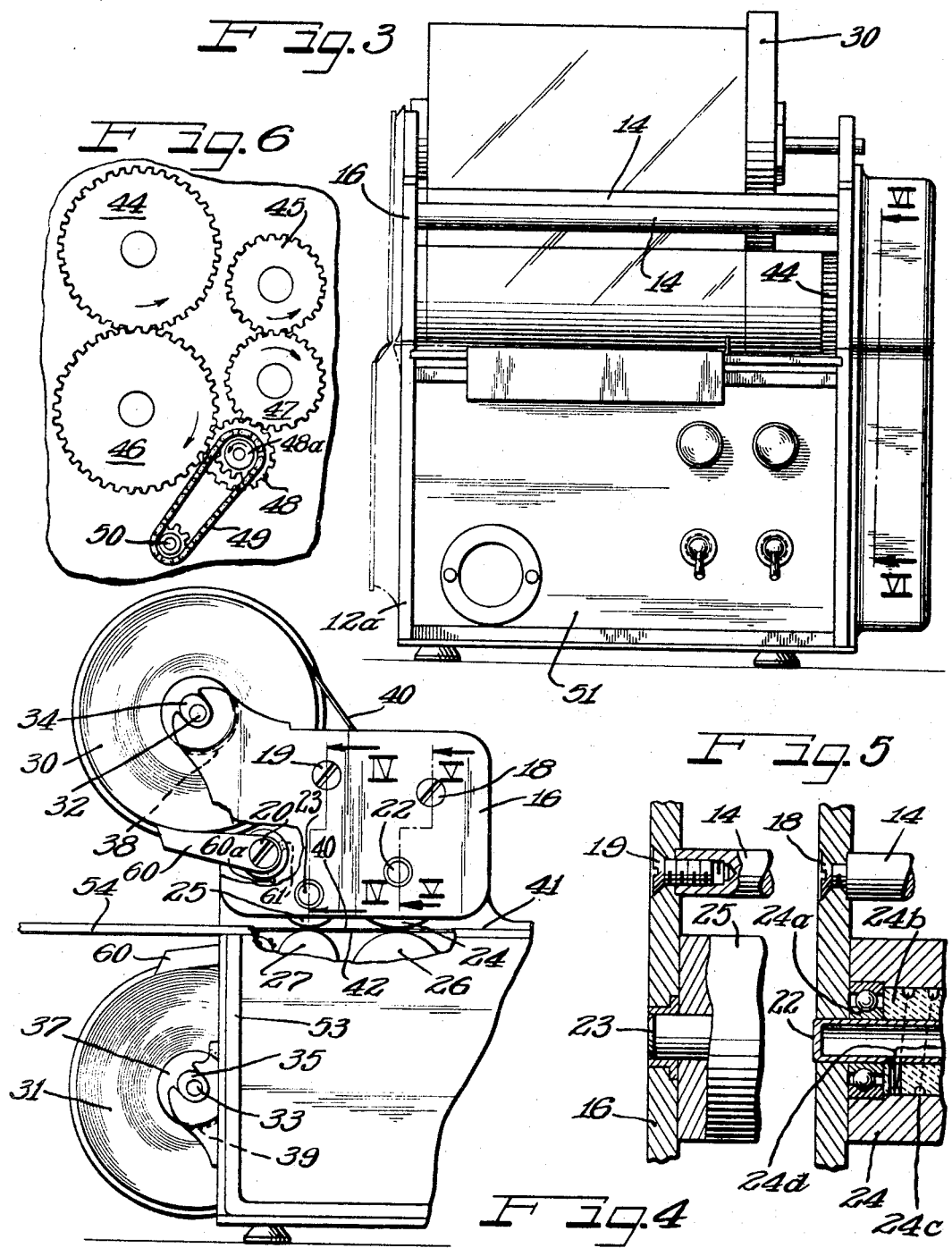

3,421,966
OPEN END LAMINATOR
John A. McLaughlin, Bon Air, Va., assignor to General Binding Corporation, Northbrook, Ill., a corporation of Illinois
Filed Aug. 20, 1965, Ser. No. 481,220
U.S. Cl. 156—555　　　　　　　　　　　7 Claims
Int. Cl. B32b 31/04

ABSTRACT OF THE DISCLOSURE

A laminating apparatus constructed to permit lamination of a single page of a book, or like product, without disassembly of the book. Rigid structure is provided for maintaining the laminating rolls in a substantially parallel relationship although the laminator frame is slotted to provide an open end at the laminating rolls.

---

The present invention relates to apparatus for laminating paper or similar materials with a plastic laminate coating. More particularly, the invention is concerned with the provision of a novel and improved form of laminator capable of laminating protective plastic coatings to pages of a book or like bound material without removing the pages from the binding or foregoing the lamination of a substantial part of the page adjacent the binding.

As those skilled in the art of laminating plastic laminates to paper and related materials are aware, apparatus has been marketed for some time fully capable of laminating single sheets in a loose condition. However, apparatus capable of laminating the sheets of books or the like while still in the bound condition has not been satisfactorily achieved. While laminates have been known to be applied to the pages of books by placing such pages in a fixed press, to my knowledge no apparatus has been successfully constructed for continuously laminating the pages of books, pamphlets, and similar bound copies. In accordance with the principles of the present invention, an open-ended laminating apparatus is provided in which the upper pressure rolls are mounted in a cantilever manner such that only one end thereof is rigidly supported relative to the lower rolls. The outboard, or unsupported, ends of the upper rolls are maintained in their proper positions by an end plate rigidly carried by cantilever rods secured to the fixed machine base. Additionally, drive mechanisms and other related components are positioned in the machine housing for driving relation with the roll components at the secured end of the upper roll in a manner permitting a substantially completely uncluttered wall surface of the laminator perpendicular to the axis of rotation of the laminating roll. This wall has a horizontal slot extending therethrough separating the upper, cantilever-supported, rolls from the lower rolls supported at both ends. As a result of this relationship, a book, or the like, may be opened in a manner leaving a page thereof projecting from the binding. This page may then be positioned for passage between the laminating rollers, with the pages not being laminated positioned firmly against the wall surface in a manner minimizing the strain on the binding and permitting a maximum area of lamination on the pages of the book.

In practice, it has been found desirable to provide for lamination of both sides of the pages of a book or pamphlet and, accordingly, the apparatus of the present invention provides laminate feed for both the upper and lower rolls. Accordingly, when such dual feed is provided, both sides of a page are laminated with plastic. However, in practice, it is oftentimes desired that only a single side of the page be provided with a plastic coating and the present apparatus is fully capable of operation to provide such a single-sided coating. This may be achieved by passing an inert film through the machine on the side of the paper not desired laminated. Kraft paper, or the like, has been suitable for this purpose.

In addition to the lamination of the pages of books or pamphlets, it is desirable to strip laminate on occasion. In such processing, a thin strip of laminate, such as for example, one inch in width, is applied to a page to laminate only an edge or other portions thereof in a srrip parallel to the longitudinal axis of the book binding. In accordance with the present invention, such strip lamination becomes a simple operation. The apparatus of the present invention is provided with an integral film-slitting knife adjustable to slit the plastic film being applied to the laminating rollers to thereby permit lamination of only a strip, for example, one inch wide, along an edge of a page. Such arrangements are desirable in helping to render passbooks, identification booklets, and the like, permanent and tamper-proof.

It is, accordingly, an object of the present invention to provide an improved laminator for applying plastic laminating film to the surface of the page of a book, or the like.

Another object of the present invention is to provide an extremely simple and yet highly efficient laminating apparatus for laminating bound pages.

Yet another object of the present invention is to provide a novel apparatus for the continuous lamination of a thin strip of laminate to the unbound edge of a book or the like.

A feature of the invention resides in the provision of a multiple roll laminating apparatus having at least a portion of the pressure rolls thereof mounted in a cantilever fashion and supported from one side only of the laminating apparatus.

Another feature of the invention resides in the simplification of drive apparatus for applying rotation to the heating and pressure rollers of a laminating apparatus.

Yet a further object of the invention is to provide a laminating apparatus capable of laminating one or both sides of a page of a bound book, or the like, within approximately $9/32''$ from the binding thereof.

Still other and further objects and features of the present invention will at once become apparent to those skilled in the art from a consideration of the attached drawings wherein two embodiments of the invention are shown by way of illustration only, and wherein:

FIGURE 1 is an isometric view of a laminating apparatus constructed in accordance with the concepts of the present invention;

FIGURE 2 is a side-elevational view, partially broken away, of the laminating apparatus shown in FIGURE 1;

FIGURE 3 is a front elevation of a modified form of the invention shown in FIGURES 1 and 2;

FIGURE 4 is a partial cross-section taken along the line IV—IV of FIGURE 2;

FIGURE 5 is a partially cut-away cross-sectional view taken along the line V—V of FIGURE 2; and FIGURE 6 is an end-elevational view taken along the line VI—VI of FIGURE 3.

As shown on the drawings:

As may be seen from a consideration of FIGURE 1, the laminator apparatus of the present invention comprises a basic machine housing generally indicated at 10 composed of side plates 11 and 12 bolted to a rigidifying front panel 51 having flanges 13 at the front of the apparatus and to one or more cross bars, not shown, at the back. The side plate 11 has an upwardly projecting integral portion thereof 11a. The portion 11a carries, rigidly secured thereto, three supporting bars 14, which rigidly support a side plate 16 by way of respective bolts 18, 19 and 20. As a result of this three-bar, three-point, support, the side plate 16 is substantially rigid in space and supports the shafts 22 and 23 of the upper heating roll 24 and upper pressure roll 25 respectively substantially parallel to their lower counter-parts 26 and 27, respectively, mounted between rigid bearings in plates 11 and 12. By employing a side plate 11 of approximately ¼ of an inch steel or tempered aluminum, an initial downward deflection of the axis of rolls 24 and 25 due to the weight thereof is compensated for by the tendency of the rolls to separate under load thereby providing an essentially parallel condition under load.

Film is supplied for laminating purposes from supply rolls 30 and 31 mounted on respective shafts 32 and 33 having friction brake elements of any conventional design, not shown, which have the reaction portion thereof held stationary by means of the non-round blocks 34, 35, respectively. As can be seen, the brake hubs 36 and 37 may be countersunk into the plates 16 and 12, as shown in the dotted lines 38 and 39 of FIGURE 2, to permit the left-hand edge of the laminating sheet of plastic, indicated at 40, to be positioned as close as possible to the plate 16, and hence as close as possible to the binding of a book page. In the same manner, the blocks 34 and 35 may have their endmost surfaces substantially flush with the surface of plate 16 in order to avoid interference with the pages of a book which is in the process of having another page thereof laminated.

In the arrangement illustrated, the heating rolls 22 and 26 are mounted about rigid axes and have their surfaces spaced from each other approximately .035 of an inch. On the other hand, pressure rolls 25 and 27, which may have rubber surfaces, preferably are in close contacting relation with each other to thereby provide substantial compression of laminating materials as they pass through the rolls. Thus, a page, or the like, indicated at 41 passes between sheets of laminating plastic 40 and 42 as the plastic moves over heating rolls 22 and 26 respectively. This three-ply sandwich then passes through the tight pressure rolls 25 and 27 and out the back of the laminating machine. With this system, laminating films on the order of .015 of an inch may be laminated to paper stock approximating .005 of an inch without difficulty and, similarly, laminating plastic films on the order of .002 of an inch may readily be laminated to a similar page. As a result, relatively stiff final pages may be provided, such as used in identification devices, or, alternatively, relatively flexible finished laminated pages may be provided.

In the embodiment illustrated, the heater rolls 24 and 26 are both constructed as illustrated in FIGURE 5. As there shown, the roll is supported on shaft 22 by antifriction bearings 24a. The roller shell 24 is, accordingly, free to roll relative to the shaft 22 and the ceramic heater core 24b. The heater core 24b is provided with a spiral slot 24c carrying a heater wire of the Nichrome resistance type 24d. The rolls 24 and 26 are provided with gears 44 and 46 respectively. These gears mesh with each other as illustrated in FIGURE 6 and rotate simultaneously in the directions indicated by the arrows in FIGURE 6. Similarly, rolls 25 and 27, comprising the steel or rubber pressure rollers are inter-geared by respective gears 45 and 47. Gears 46 and 47 are simultaneously driven by a drive gear 48 which is in turn driven by a sprocket chain 49, or the like, from a main drive sprocket 50 driven by an electrical motor preferably having its axis parallel to the axis of the rollers and positioned immediately behind the front panel 51 of the machine. By the arrangement illustrated, the entire drive may be positioned between the walls 11 and 12, except for the extension of the drive sprockets 48a and 50, all of which may be accommodated in the right-hand side cover 52. As a result of this arrangement, it becomes unnecessary to provide a closure box of the type illustrated at 53 in FIGURE 1, although in some installations in which a particularly powerful drive motor is desired, the additional space of the decorative side cover 53 may be desirable.

In the embodiment of the invention illustrated in FIGURES 1 and 2, a work-supporting shelf 54 is provided. This shelf provides an extension of the main supporting platform 55 which carries a guide plate 56 having an upstanding edge lip 57. The extension 54 serves to support the volume being laminated, and, depending upon the type of work, may be very useful. For example, when laminating thin pamphlets or similar documents having loose bindings, the availability of the shelf 54 may be quite advantageous. In such installations it is preferred that the shelf be rigidly supported, and provision of this support is readily accomplished by provision of the cover 53 which is secured to the side wall 12 in any convenient manner, such as by bolting.

On the other hand, in situations in which a relatively stiffly bound book is having portions thereof laminated, it is desirable that the binding be opened no more than 180°. This is readily accomplished as illustrated in the modified form of the invention shown in FIGURE 3. There, the shelf 54 and its supporting box 53 have been removed, leaving an essentially flat surface provided by wall 16 and side wall 12a. As pointed out above, side wall 12 may in all cases be provided flush, without projecting equipment passing therethrough for enclosure by the housing box 53. In such cases side walls 12 and 12a would be identical. However, in view of the fact that the embodiment of the invention illustrated in FIGURE 1 is capable of enclosing extended mechanical apparatus, side wall 12a, shown in FIGURE 3, is given a separate numeral. It will be understood, however, that the apparatus in FIGURE 3 may readily be converted to incorporate a side shelf 54 supported by box 53 merely by adding the shelf and box to the side wall 12a by standard fastening techniques. In any event, position of the completely clear side surface formed by walls 12a and 16 permits the lamination of a page of a relatively stiffly bound book, or the like, safely and to a maximum depth of lamination. When utilizing the apparatus in the manner shown in FIGURE 3, it will be understood that the side walls 12a and 16a may be provided with rearward extensions, either integral or rigidly secured thereto, to provide for a support in the vertical plane, for the book as it passes completely through and beyond the pressure rollers 25, 27.

As pointed out above, it is possible to use the present apparatus as a device for laminating a relatively narrow strip of plastic film to a page of a book or the like. This may be accomplished by utilization of a cutter blade 60 pivotally secured to support bar 20 and spring-biased against roll 30 by a coil spring 60a, or the like. This blade may be axially adjusted, by loosening the set screw 61, from an inoperative position outside the length of the spool 30 into any position along the face of the plastic film 40, at which position it will slit the oncoming plastic film 40. Under these circumstances, the left-handmost portion of the slit film, as viewed in FIGURE 3, will be laminated to a page projecting into the nip of the laminator. In such operation the binding of the book is moved further toward the left to provide for contacting only the outermost edge of the page with the ribbon of laminate at the left-hand side of the machine, as viewed in FIGURE 3. In view of the knife 60, film will not leave the spool 30 and will, instead, be saved for later use. Of course, a knife 60 may be employed with the lower spool 31.

It is preferred in operating the apparatus of the present invention that a thermoplastic film of a heat-sealable type be employed. Very satisfactory results have been achieved with the use of laminated, combined, materials of sheet polyethylene and polyester materials. In utilization of such combinations, the polyethylene surfaces of the film are positioned for contact with the page of the book to be laminated and after passing over the heating rolls 24, 26, the polyethylene heat-seals satisfactorily to the page. The polyester acts as a carrier element, provides a protective coating, adds substantial tear strength to the laminated product, and protects the rolls from accumulating a polyethylene coating during the laminating process. It will be understood, however, that substantially any thermoplastic or pressure-sensitive films may readily be utilized in the apparatus of the present invention so long as it will heat-seal to lamination products. It will also be apparent, as explained above, that a single side only of a page may readily be laminated by substituting a roll of inert material such as for example kraft paper for the supply spool 30 or 31. In these circumstances, the paper will readily pull away from the page to be laminated, leaving a film only on one side thereof.

It will be apparent to those skilled in the art that variations and modifications may be made in accordance with the present invention without departing from the novel concepts thereof. For example, in the device as illustrated, several dimensions have been exaggerated for ease of description, and such dimensions may be varied in actual practice. For example, the dimensions of the drive gears 44, 46, 47 and 45 may be varied to provide more closely equal rotational speeds for gears 47 and 46, although it is desired that the pressure rollers 45 and 47 rotate at slightly greater speed than the heater rolls 44, 46 in order to provide constant tension on the laminate. Similarly, the film 40 may be run slightly closer to the walls 12, 12a, and 16 than illustrated in FIGURE 3. It is my intention also, that substantially any conventional form of heater roll and pressure roll may be employed with the apparatus of the present invention without departing from my inventive concepts.

Accordingly, it is my intent that the scope of the invention be limited solely by that of the hereinafter appended claims.

I claim as my invention:

1. In combination in a laminating apparatus for thermoplastically securing a layer of plastic material to a sheet of paper or the like, comprising a pair of pressure rollers, means rigidly securing said rollers in spaced position relative to each other, means positively driving said rollers in opposite directions, said rigid securing means and driving means being supported entirely at one end of said rollers whereby said rollers are supported cantilever-fashion relative to each other and the passageway between said rollers is open at the other end, heating means positioned ahead of and in substantially parallel relation to each of said rollers, and means supplying film to each of said rollers via said heating means, said means rigidly securing said rollers in spaced position including a plate positioned at the other end of and supporting said other end of one of said pressure rollers and its respective heating means, and a plurality of support bars rigidly connecting said plate to means rigidly supporting the other pressure roller, said plate and the last-named means providing a flat open path for portions of a book or the like not in said passageway.

2. In combination in a laminating apparatus for thermoplastically securing a layer of plastic material to a sheet of paper or the like, comprising a pair of pressure rollers, means rigidly securing said rollers in spaced position relative to each other for rotation in opposite directions, said means being supported entirely at one end of said rollers whereby said rollers are supported cantilever-fashion relative to each other and the passageway between said rollers is open at the other end, heating means positioned ahead of and in substantially parallel relation to each of said rollers, and means supplying film to each of said rollers via said heating means, said heating means comprising a heating roller positioned in advance of each of said pressure rollers and rotating the same direction as its respective pressure roller, said means rigidly securing said rollers in spaced relation including a plate positioned at said other end and supporting said other end of one of said pressure rollers and its respective heating roller, and a plurality of support bars rigidly connecting said plate to the means rigidly supporting the other rollers.

3. In combination in a laminating apparatus for thermoplastically securing a layer of plastic material to a sheet of paper or the like, comprising a pair of pressure rollers, means rigidly securing said rollers in spaced position relative to each other for rotation in opposite directions, said means being supported entirely at one end of said rollers whereby said rollers are supported cantilever-fashion relative to each other and the passageway between said rollers is open at the other end, heating means positioned ahead of and in substantially parallel relation to each of said rollers, and means supplying film to each of said rollers via said heating means, said heating means comprising a heating roller positioned in advance of each of said pressure rollers and rotating the same direction as its respective pressure roller, said means rigidly securing said rollers in spaced relation including a plate positioned at said other end and supporting the other end of one of said pressure rollers, its respective heating roller and film supply means, and a plurality of support bars rigidly connecting said plate to the means rigidly supporting the other rollers.

4. A laminating apparatus for securing a layer of plastic material to a sheet of paper or the like, comprising a pair of rigid side walls, a pressure roller rotatably supported by and between said side walls, one of said side walls extending upwardly beyond said pressure roller, a second pressure roller for co-operation with said first pressure roller and having one end thereof supported in said extended side wall and the other end thereof rotatably supported in means secured to said one side wall cantilever-fashion leaving a passage between said last-named means and the other of said side walls for the passage of a book page or the like, said last-named means providing a smooth flush surface for guiding the portion of the book not positioned in said passage, and means supplying a thin plastic film between said rollers in contact with said page for pressurized attachment to said page upon passing through said passage.

5. A laminating apparatus for securing a layer of plastic material to a sheet of paper or the like, comprising a pair of rigid side walls, a pressure roller rotatably supported by and between said side walls, one of said side walls extending upwardly beyond said pressure roller, a second pressure roller for co-operation with said first pressure roller and having one end thereof supported in said extended side wall and the other end thereof rotatably supported in means secured to said one side wall cantilever-fashion leaving a passage between said last-named means and the other of said side walls for the passage of a book page or the like, said last-named means providing a smooth flush surface for guiding the portion of the book not positioned in said passage, and means supplying a thin plastic film between said rollers in contact with said page for pressurized attachment to said page upon passing through said passage, and a shelf extending parallel to said passageway and beyond said other side wall for supporting a portion of the laminated book in horizontal position as the book page passes through said passageway.

6. In combination in a laminating apparatus for securing a layer of sheet material to a portion of a sheet of paper or the like, a pair of rollers, means rigidly supporting said rollers for rotation about axes parallel to each other, said means comprising a support at one end of the rolls rigidly carrying said rolls for relative rotation, first plate means carrying the other end of one of the rolls and rigidly connected to said support, and second plate means separated from said first plate throughout the path of lamination of said sheet and rigidly connected to said support, whereby an opening is provided between said first and second plates between said rolls to permit passage of unlaminated material during lamination of a portion attached thereto.

7. A laminating apparatus for thermoplastically securing a layer of plastic material to a sheet of paper or the like, comprising a pair of rigid side walls, a pressure roller rotatably supported by and between said side pressure roller rotatably supported by and between said side walls, one of said side walls extending upwardly beyond said pressure roller, a second pressure roller for cooperation with said first pressure roller and having one end thereof supported in said extended side wall and the other end thereof rotatably supported in plate means secured to said one side wall cantilever-fashion by support rod means leaving a passage between said plate means and the other of said side walls for the passage of a book page or the like, and means supplying a film of thermoplastic material between said pressure rollers in contact with said book page.

References Cited
UNITED STATES PATENTS

| | | | |
|---|---|---|---|
| 2,218,096 | 10/1940 | Reinitz | 68—244 |
| 3,309,983 | 3/1967 | Dresser | 150—93 |

DOUGLAS J. DRUMMOND, *Primary Examiner.*

U.S. Cl. X.R.

156—510; 100—93, 176